(12) United States Patent
Boutall et al.

(10) Patent No.: US 7,563,306 B2
(45) Date of Patent: Jul. 21, 2009

(54) HIGH EFFICIENCY HEATING AND DRYING USING SHIELDED RADIANT HEATER

(75) Inventors: Charles A. Boutall, Bay St. Louis, MS (US); Albert Keith Teakell, Jenks, OK (US)

(73) Assignee: Technologies Holdings Corporation, Houston, TX (US)

( * ) Notice: Subject to any disclaimer, the term of this patent is extended or adjusted under 35 U.S.C. 154(b) by 453 days.

(21) Appl. No.: 11/499,103

(22) Filed: Aug. 4, 2006

(65) Prior Publication Data

US 2007/0051243 A1    Mar. 8, 2007

Related U.S. Application Data

(60) Provisional application No. 60/705,904, filed on Aug. 5, 2005.

(51) Int. Cl.
*B01D 53/06* (2006.01)

(52) U.S. Cl. .............................. 95/113; 95/123; 96/125; 96/127; 96/146; 96/152; 96/144; 431/151

(58) Field of Classification Search ....................... 95/14, 95/113, 117, 123, 148; 96/112, 125–128, 96/139, 146, 150, 152, 154, 143, 144; 62/94, 62/271; 165/7; 431/151, 285, 326
See application file for complete search history.

(56) References Cited

U.S. PATENT DOCUMENTS

| | | | | |
|---|---|---|---|---|
| 2,328,974 A | * | 9/1943 | Guler | 96/112 |
| 3,160,401 A | * | 12/1964 | Wollner | 432/222 |
| 3,774,374 A | * | 11/1973 | Dufour et al. | 96/112 |
| 3,828,528 A | * | 8/1974 | Weil | 96/144 |
| 3,889,742 A | * | 6/1975 | Rush et al. | 96/144 |
| 4,134,743 A | * | 1/1979 | Macriss et al. | 95/113 |
| 4,732,093 A | | 3/1988 | Hansen et al. | 110/347 |
| 4,768,948 A | | 9/1988 | Hansen et al. | 431/187 |
| 4,967,726 A | * | 11/1990 | Finch | 126/99 R |
| 5,020,334 A | | 6/1991 | Wilkinson | 62/271 |
| 5,147,420 A | * | 9/1992 | Claesson | 95/113 |
| 5,373,704 A | | 12/1994 | McFadden | 62/94 |
| 5,562,089 A | * | 10/1996 | Astle, Jr | 126/117 |
| 5,941,233 A | * | 8/1999 | Grinols et al. | 126/110 R |

(Continued)

FOREIGN PATENT DOCUMENTS

JP    63075408 A2    4/1988

(Continued)

*Primary Examiner*—Frank M Lawrence
(74) *Attorney, Agent, or Firm*—Bonnie J. Davis; John H. Runnels

(57) ABSTRACT

An apparatus and method of conditioning humidity and temperature in the process air stream of a desiccant dehumidifier used to dry moisture-laden spaces and structures by replacing moisture-laden air with dehumidified air to increase the rate of water evaporation within the affected areas. An air-dehumidifier comprises a dehumidification assembly having a desiccant rotor assembly, a shielded radiant burner assembly, and a control system. The shielded radiant burner assembly is used to regenerate the desiccant rotor by removing moisture from the reactivation quadrant, where high velocity (at least 500 ft/min) air streams are often flowed, by projecting radiant heat onto the rotor, while minimizing the potential for the high velocity air streams interrupting the combustion of air and fuel in the radiant burner.

35 Claims, 3 Drawing Sheets

U.S. PATENT DOCUMENTS

| | | | |
|---|---|---|---|
| 6,003,327 A * | 12/1999 | Belding et al. | 62/271 |
| 6,083,300 A * | 7/2000 | McFadden | 95/113 |
| 6,575,228 B1 | 6/2003 | Ragland et al. | 165/54 |
| 6,751,964 B2 * | 6/2004 | Fischer | 62/94 |
| 2005/0076781 A1 * | 4/2005 | Hess | 96/135 |
| 2005/0252229 A1 * | 11/2005 | Moratalla | 62/271 |

FOREIGN PATENT DOCUMENTS

| | | |
|---|---|---|
| JP | 09060824 A2 | 3/1997 |
| JP | 2002276998 | 9/2002 |
| WO | WO 87/04772 | 8/1987 |

\* cited by examiner

HIGH EFFICIENCY HEATING AND DRYING USING SHIELDED RADIANT HEATER

This invention pertains to an apparatus and method to enhance the overall performance of air-dehumidifiers one or more of the following ways: by increasing heating and drying efficiency, by reducing the overall size of the air-dehumidifier, or by reducing the amount of unwanted atmospheric emissions.

Buildings and homes continuously face potential water damage from unforeseeable events such as pipe failures, natural floods, roof leaks, and storms. Some structures may also sustain water damage from high moisture-laden air resulting from, for example, excessive humidity, improper ventilation, or malfunctioning heating, ventilating and air conditioning systems. To prevent permanent water damage to the structure and subsequent microbiological growth it can be imperative that the structure be immediately dried.

Structural drying involves the transfer of moisture from one environment (e.g., inside a structure or building, etc.) to another environment (e.g., outside a structure or building, etc.) by evaporating the moisture using dry air, and then either dehumidifying or replacing the resulting moisture-laden air with more dry air. The time required to dry a moisture-laden structure depends on the rate of evaporation, and the ability of localized air to absorb and remove moisture from the affected area.

Current methods for drying water-damaged structures often involve desiccant rotor systems. One of the most common desiccant configurations is the "four-holer," also referred to as a "75/25" split, which uses two separate airstreams, process and reactivation, with seventy-five percent of the desiccant rotor space dedicated to the process airstream for dehumidification, and twenty-five percent dedicated to the reactivation airstream for reactivating the desiccant rotor by heating the desiccant mass using a reactivation heater. This configuration typically provides a high level of grain depression (i.e., the measurement of water removed through dehumidification processes, measured in grains—one grain is equivalent to approximately $1/7000$ lb $H_2O$) (typically 50-60 grains when air moisture is high) because it uses most of the desiccant rotor for process airflow, but it also uses more energy and has higher heat carryover from the reactivation airstream to the process airstream than do other desiccant configurations.

Another common desiccant configuration, also unregulated, is the "three-holer," also referred to as the "purge," which uses less energy than the four-holer, but provides less grain depression (e.g., about 25-35 grains) and lower delivered air pressure since it uses only fifty percent of the desiccant rotor for process airflow. In this configuration, air entering the rotor is split into two separate airstreams. Fifty percent of the airstream flows through the desiccant rotor for dehumidification processing, twenty-five percent is used to recover "carryover heat," i.e., heat remaining in the rotor mass after the desiccant has been reactivated by a reactivation heater, and the remaining twenty-five percent is used for desiccant reactivation. These systems are usually run continuously until moisture is substantially removed.

There are several problems with using the previous systems reactivated by reactivation heaters to dry a moisture-laden area. First, the size of the previous systems do not allow for bulk transportation. Second, previous systems employing direct flame often utilize a multitude of components to control dehumidification processes, which usually require additional service and repair time. Finally, previous systems are less energy efficient resulting in additional operating costs.

U.S. Pat. No. 6,575,228 describes a device and method for ventilating fresh air into a conditioned space, comprising a desiccant wheel that dehumidifies incoming air by exchanging moisture from the incoming air with out-flowing air. In one embodiment, a regenerative heater is used to regenerate and defrost the desiccant wheel so that the out-flowing air can be heated and dehumidified before it passes through the desiccant wheel.

Japanese Pat. Abstract No. 2002276998 describes a device for supplying low temperature and low humidity air to a conditioned space, comprising a desiccant dehumidifier having a dehumidifying rotor, and a heat exchanger having a primary and secondary side. In one embodiment, moisture is absorbed from air passing through the primary side using a dehumidifying agent, and then is released from the agent by exposing it to heated air at the secondary side.

Japanese Pat. Abstract No. 09060824A2 describes a device for restraining the generation of $NO_x$ associated with combustion, comprising the steps of preheating air using a heat storage body, creating a spiraling air flow for jetting into a radiant tube using a swirl vane, and jetting fuel gas linearly at a high flow velocity into the radiant tube.

Japanese Pat. Abstract No. 63075408A2 describes a device for achieving a soft two-stage combustion with a low $NO_x$, comprising an enlarged-type movable nozzle fitted with swirling vanes at the tip of a gas burner and forming a primary combustion tube at the tip of the outer periphery of the nozzle.

U.S. Pat. Nos. 4,732,093 and 4,768,948; and WO 87/04772 describe a method and apparatus for burning fuel in an annular-nozzle burner wherein a compact flame is generated by inhibiting the dispersion of fuel particles and concentrating the fuel particles in a primary combustion area, comprising a burner for ejecting fuel into a combustion chamber having an inner-core area, an outer fuel-entry annulus substantially surrounding said inner-core area, a means for ejecting fuel into the combustion chamber, a means for limiting the amount of combustion air passing there-through, and a linear-flow means for causing the fuel flowing from the annulus to be in an essentially linear-flow state.

U.S. Pat. No. 6,003,327 describes a device and method for dehumidifying and cooling air in an air-conditioning system, comprising an absorption wheel, a heat exchanger and an evaporative cooler. In one embodiment, the device heats incoming air as it passes through the absorption wheel to remove humidity, and then cools the heated, incoming air by passing it through a heat exchanger followed by an evaporative cooler. In another embodiment, a portion of the incoming air flows directly to the evaporative cooler, bypassing the absorption wheel and heat exchanger.

U.S. Pat. No. 5,373,704 describes a device and method for recirculating and dehumidifying air within a living space, comprising an evaporator coil, a desiccant wheel, and a heat exchanger enclosed by partitions that form a first air treatment passageway and a second or regenerative air passageway. In one embodiment, air from within the living space is first drawn into a conduit and partitioned so that a portion of the air passes through the first air treatment passageway and the desiccant wheel to reduce its moisture content, while simultaneously passing outside air through the regenerative air passageway to remove moisture absorbed from the first air treatment passageway. The drier air is then remixed with the air within the conduit and cooled by passing it through the evaporator coil before returning it to the living space.

U.S. Pat. No. 5,020,334 describes a device for dehumidifying and cooling air within an enclosed space, comprising a refrigeration subsystem and a liquid desiccant dehumidification subsystem. In one embodiment, the device passes outside ventilation air through the dehumidification subsystem to remove moisture from the air, and then combines the drier air with air re-circulated from the enclosed space. The air then passes through the refrigeration subsystem before it returns to the enclosed space.

A need exists for an apparatus and method of enhancing the performance of a dehumidifier in conditioning air to remove water vapor from moisture-laden spaces and structures.

Additionally, other objects or products that require drying or heating are increasingly being used in various industries besides spaces and structures, including the food, construction, and fabrication industries, and for providing warmth to mammals. A need exists for an apparatus capable of providing focused heat to mammals, objects or products at specified temperatures.

We have discovered an apparatus and method to enhance the overall performance of air-dehumidifiers for conditioning air to allow for the removal of water vapor from moisture-laden spaces and structures (e.g., buildings, homes, maritime vessels, manufacturing facilities, and storage facilities) in one or more of the following ways: by increasing heating and drying efficiency, by reducing the amount of unwanted atmospheric emissions, or by reducing the overall size of the dehumidifier. Compared to other direct-fired dehumidifiers, the novel apparatus reduces energy consumption and the overall assembly size. The basic design of the apparatus is that of a conventional air-dehumidifier comprising a desiccant rotor (e.g., silica gel, molecular sieve, or lithium chloride) having one or more process chambers and one or more reactivation chambers, a process air blower, a reactivation air blower, a control system, and a shielded radiant burner assembly. In one embodiment, the shielded radiant burner assembly comprises a radiant burner having a directional shield, a combustion blower, and a combustion air plenum adapted to supply fuel (e.g., propane, natural gas, etc.) and air to the burner. In this embodiment, the radiant burner is used to regenerate the desiccant rotor by removing moisture from the reactivation chamber, where high velocity air streams (i.e., air streams traveling at speeds of at least 500 feet/min) are often flowed by controllably projecting radiant heat onto the rotor, while minimizing the potential for high velocity air streams interrupting combustion of air and fuel in the radiant burner.

In a preferred embodiment, the combustion blower further comprises a damper, which allows for the control of air and fuel intake pressure into the burner by controllably pressurizing an intake of air and fuel to a level sufficiently greater than ambient pressure, and loading the air and fuel into the burner.

The shielded radiant burner assembly may be adapted to focus radiant heat at specified temperatures onto mammals and at other objects or products in various industries including food, construction, and fabrication industries.

Figure 1:
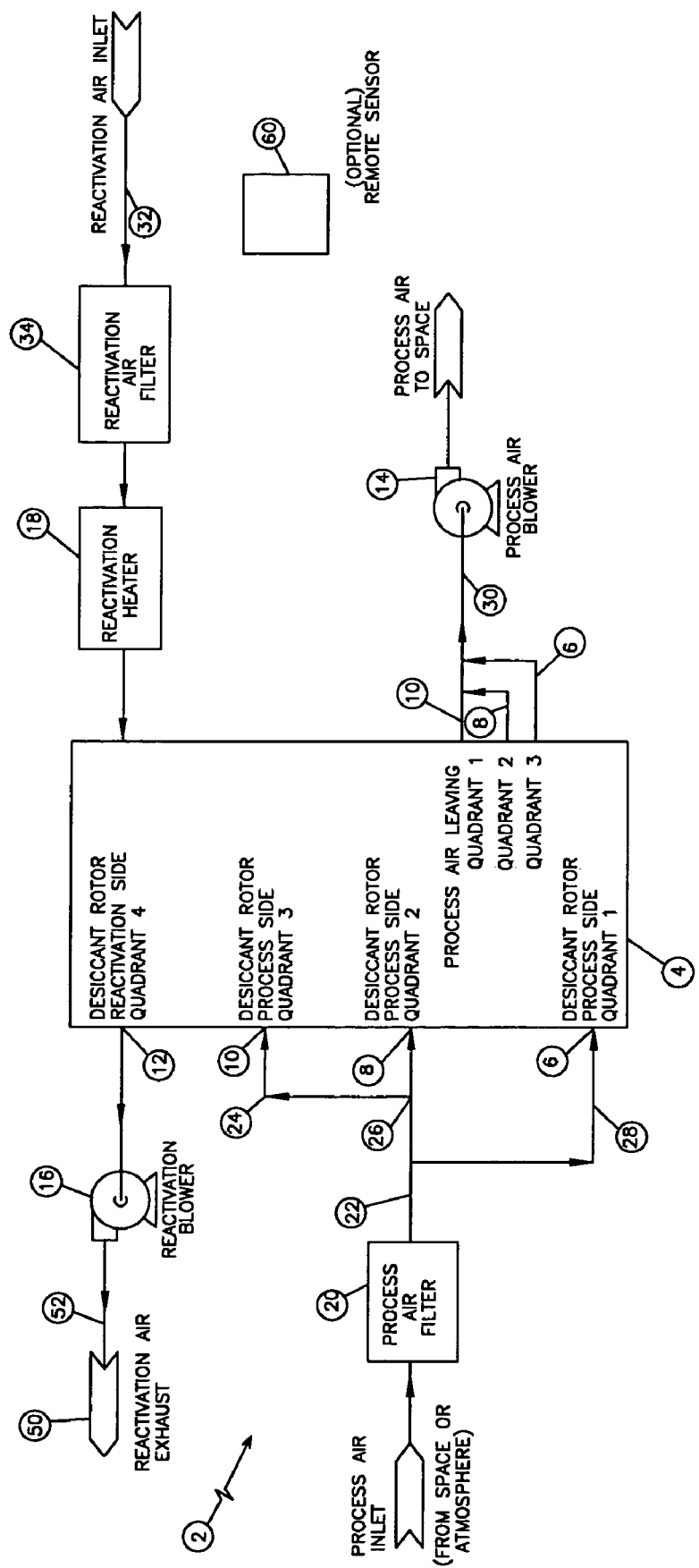
FIG. 1 illustrates schematically a block diagram of the major components of a dehumidifier unit having one embodiment of the shielded radiant burner assembly.

A general purpose of this invention is to provide a reliable, inexpensive apparatus and method that enhances the overall performance of air dehumidifiers including the heat-modulating dehumidifier described in U.S. patent application Ser. No. 11/070,603. In a preferred embodiment, the basic design of the apparatus is that of a conventional air-dehumidifier (e.g., propane, natural gas, etc.) comprising a desiccant rotor (e.g., silica gel, molecular seive, or lithium chloride) having one or more process chambers and one or more reactivation chambers, a process air blower, a reactivation air blower, and a control system. The mechanical components should be capable of withstanding the heat produced internally during the operation, and should have a relatively high mechanical strength, and a relatively high resistance to corrosion, friction, and wear, such as aluminum, cast iron, steel, stainless steel, titanium, polytetrafluoroethylene, and graphite composites. To enhance the overall dehumidifier performance, the basic design further comprises a shielded radiant burner assembly capable of controllably projecting radiant heat onto the desiccant rotor to remove moisture from the one or more reactivation chambers, while minimizing the potential for air streams traveling towards the the one or more reactivation chambers from interrupting the combustion of air and fuel in the radiant burner.

The shielded radiant burner assembly may also be adapted to project radiant heat at a specified temperature towards mammals, objects and products (e.g., rice, plastic pellets, sugar, etc.) by either altering various features, including the size and shape of the directional shield (e.g., circular, triangular, rectangular, square-shaped, etc.), or by altering the radiant heat output, or both. An air blower may be added to the shielded radiant burner assembly to draw an air stream near the directional shield such that a suitable amount of radiant heat is transferred from the radiant burner to the air stream by convecting the radiant heat through the directional shield. Optionally, an air plenum may be used to help direct the air stream near the directional shield.

There are several advantages to drying moisture-laden spaces and structures using this device. First, the number of components may be minimal. Fabrication may be simple and inexpensive. Second, the potential for mechanical failure of the heating system is reduced. Third, energy consumption and maintenance costs are reduced. Fourth, the time needed to dry moisture-laden spaces and structures may be reduced. A control system may be used to improve drying time and energy efficiency by monitoring the temperature and humidity of the air within the affected area, and continuously adjusting the humidity and temperature levels of the exiting post-process air by increasing or decreasing the amount of radiant heat projected onto the desiccant rotor. Fifth, health risks associated with prolonged exposure to excessive heat and microbiological growth, and the operation of humidity-sensitive electronics (e.g., home appliances, computers, televisions, light fixtures, etc.) may be reduced. Sixth, the device may be portable and easily installed and removed, leaving little or no evidence of its previous operation.

EXAMPLE 1

FIG. 1 illustrates schematically a block diagram of one embodiment of a conventional air dehumidifier 2 and the process of dehumidifying air, in accordance with this invention. This embodiment comprises a desiccant rotor 4 having three process chambers (6, 8, and 10) and a reactivation chamber 12, a process air blower 14, a reactivation air blower 16, a control system (not shown), and a shielded radiant burner assembly 18. Desiccant rotor 4 functions as the main source for providing conditioned air to an affected area by removing water from pre-process air (i.e., untreated air drawn from either inside or outside the moisture-laden area) before the air is ejected into the affected area. A drive motor (not shown) used for rotating desiccant rotor 4 in one embodiment is an alternating current induction motor sized to fit within a given operating space. In an alternative embodiment, the drive motor may be a direct current motor, a hydraulic motor, or an internal combustion engine. The drive motor has a drive ratio (ratio of motor speed to desiccant rotor speed) and a power output sufficient to allow the drive motor to controllably spin desiccant rotor 4 at a predetermined speed.

Desiccant rotor 4 in a prototype embodiment comprised a four hole-type silica gel desiccant rotor adapted to fit within a given operating space for inside usage and to dehumidify pre-process air, using all of the available process rotor space.

As illustrated in FIG. 1, ambient air or air returned from the affected area (pre-process air) first passed through air-filtered inlet 20 to remove materials such as dust particles and insects before passing along line 22. The pre-process air flowing along line 22 was divided among lines 24, 26, and 28 before entering process sections 10, 8, and 6, respectively. The flow of air and the rotation of desiccant rotor 4 complemented each other such that the pre-process air was heated and dehumidified to a predetermined level before it exited desiccant rotor 4 and was combined along line 30.

As illustrated in FIG. 1, post-process air flowing along line 30 was ejected from process air blower 14 into the affected area. (When operating the system from an area external to the affected area, ducts may be used to route post-process air from process air blower 14 to the affected area and to return pre-process air to filtered inlet 20.) Reactivation air blower 16 drew the pre-reactivation air stream along line 32 through reactivation air filter 34 to remove materials such as dust particles and insects, before routing the air stream near directional shield 40 (more fully described below), located within reactivation air plenum 41, and through reactivation chamber 12. See also FIG. 2.

As illustrated in FIG. 1, shielded radiant burner assembly 18 was used to heat the pre-reactivation air flowing along line 32 before it entered reactivation chamber 12. In this embodiment, shielded radiant burner assembly 18 was sized and shaped to fit within a given space and to add sufficient heat to the pre-reactivation air flowing along line 32. See FIG. 2. Optionally, shielded radiant burner assembly 18 further comprises a control system (not shown) having a temperature sensor (e.g., thermostat) for measuring the temperature of pre-reactivation air flowing through reactivation air plenum 41. In this embodiment, the control system controls the temperature of the pre-reactivation air in reactivation air plenum 41 by modulating the gas pressure and combustion airflow to adjust the amount of radiant heat generated by radiant burner 38. See also FIG. 2. Alternatively, a controller assembly (not shown) having an ignition controller and a temperature sensor (e.g., a thermostat) may be used to control the temperature of the pre-reactivation air stream by controllably varying the speed of combustion blower 36 and the air and gas pressures supplied to radiant burner 38 to adjust the amount of radiant heat generated by radiant burner 38. In this embodiment, the ignition controller is adapted to monitor the temperature of pre-reactivation air and to control combustion timing and duration. The thermostat, which may be positioned near desiccant rotor 4, measures the temperature of pre-reactivation air entering desiccant rotor 4.

Figure 2:
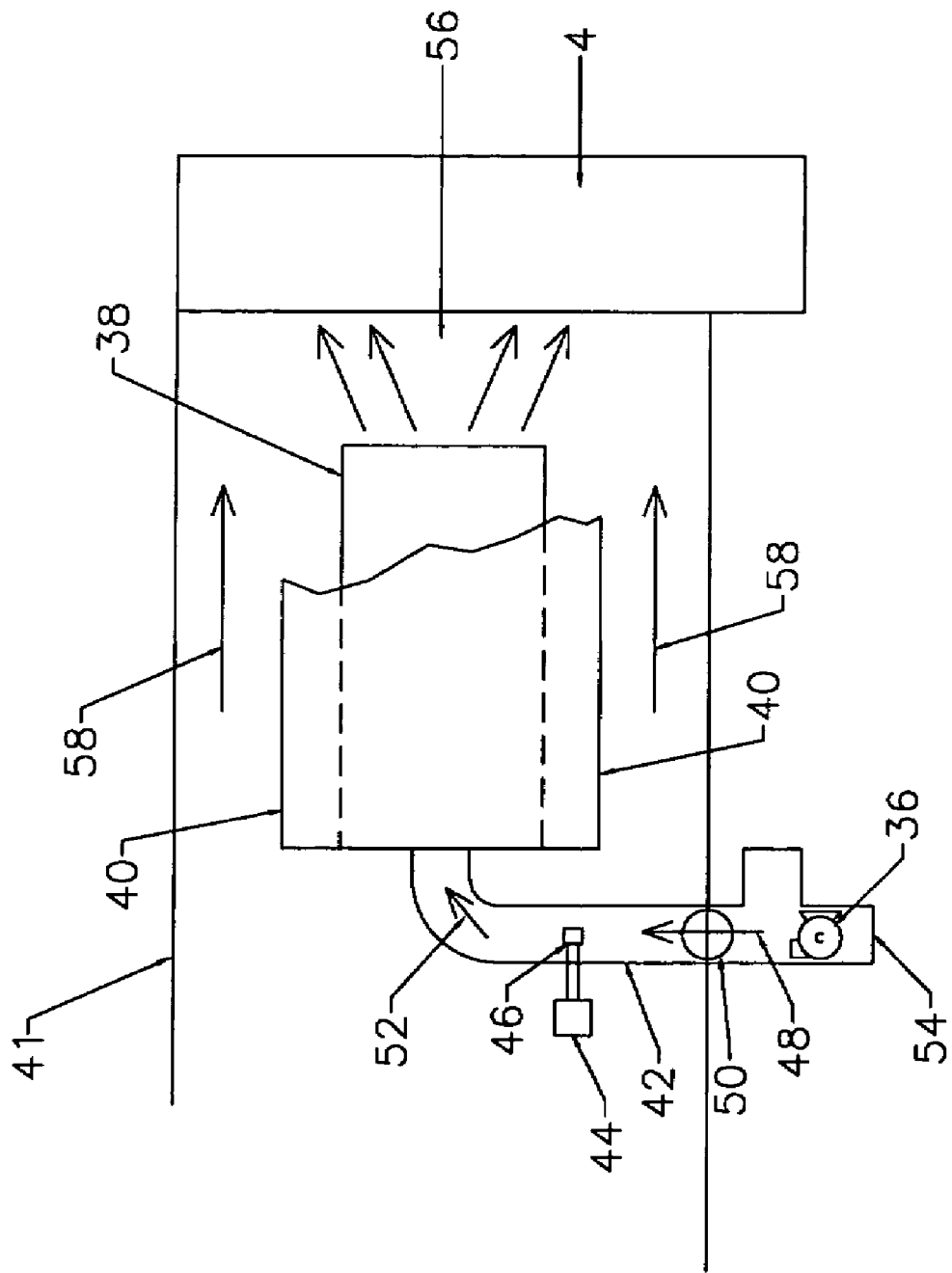
FIG. 2 illustrates a side plan view of one embodiment of the shielded radiant burner assembly.
Figure 3:
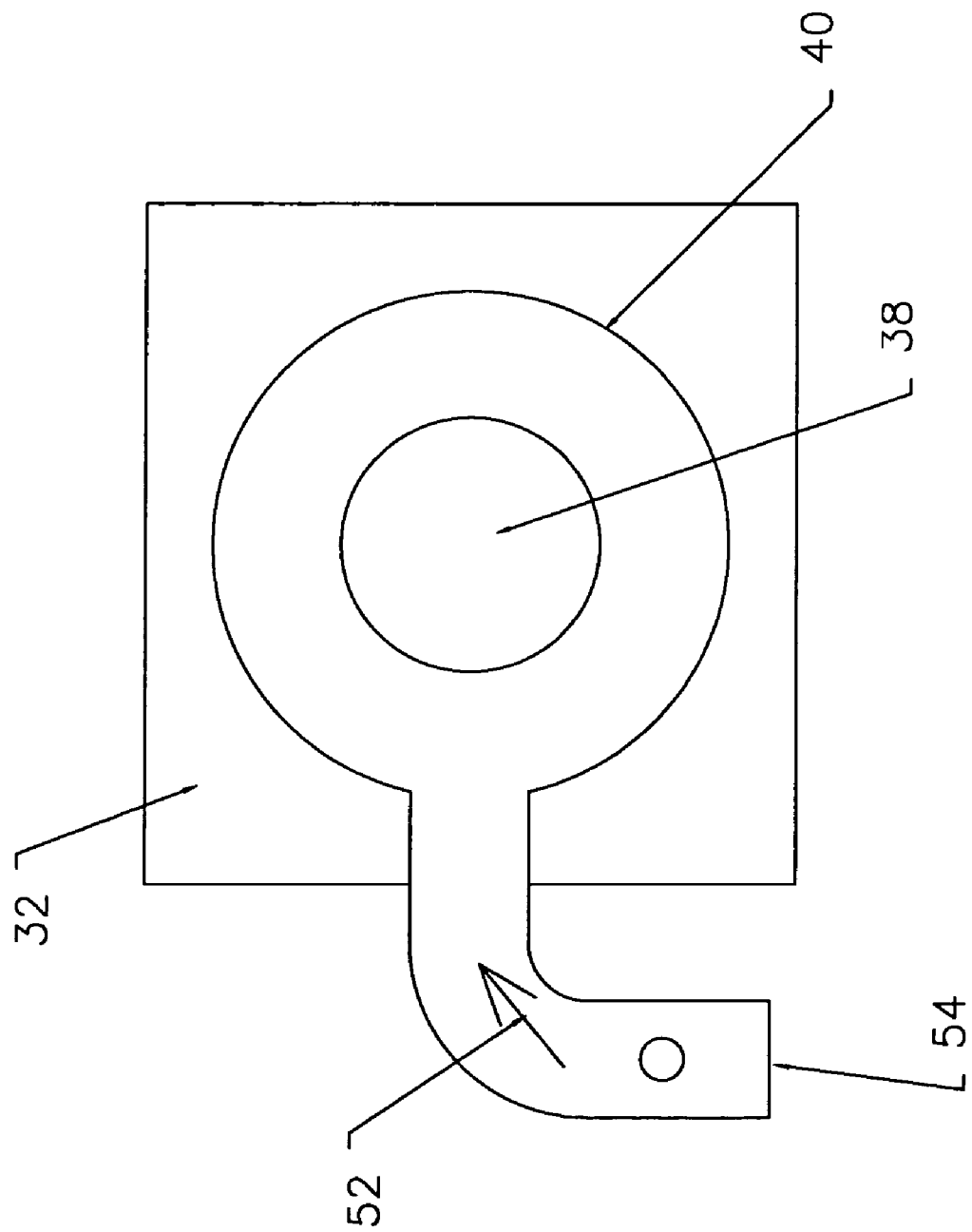
FIG. 3 illustrates a front plan view of one embodiment of the shielded radiant burner assembly.

FIG. 2 illustrates schematically one embodiment of shielded radiant burner assembly 18, in accordance with this invention. Shielded radiant burner assembly 18, located inside reactivation air plenum 41, comprises a radiant burner 38 having a directional shield 40, a combustion blower 36, and a combustion air plenum 42 adapted to mix and supply fuel and air to burner 38. See also FIG. 3. In a preferred embodiment, combustion blower 36 further comprises a damper (not shown) adapted to allow for the control of air and fuel intake pressure into radiant burner 38 by controllably pressurizing air and fuel to a level greater than ambient pressure, and capable of creating a substantial amount of radiant heat able to remove moisture from desiccant rotor 4 when ignited. Factors considered in designing embodiments of shielded radiant burner assembly 18 for retrofitting in a conventional dehumidifier include reactivation fuel type, physical size, inside or outside usage, airflow characteristics (i.e., positive, negative, or neutral air-flow), desiccant rotor composition, dehumidification rate, and air intake capacity. These factors are also considered in designing embodiments of shielded radiant burner assembly 18 for use in projecting radiant heat at a specified temperature towards mammals, objects and products (e.g., rice, plastic pellets, sugar, etc.).

As shown in FIG. 2, a regulated gas valve 44 was used to deliver flammable gas (e.g., propane or natural gas) through gas orifice 46. Gas orifice 46 had at least one inlet (not shown) sized to enhance the dispersion of gas into air stream 48 by dispersing the gas in multiple directions. As air stream 48 was drawn through combustion blower 36 and into air orifice 50, it was mixed with the flammable gas to produce a gas-air combustion mixture 52 inside supply pipe 42. Air orifice 50 had at least one inlet (not shown) sized to regulate air flowing through supply pipe 42. In a preferred embodiment, to induce turbulent mixing of the flammable gas and air for greater burning efficiency, the supply pipe entered radiant burner 38 at an angle of 90° (other angles may be used depending on the fuel type, flowrate of air and fuel, etc.). The mixture was then flowed into radiant burner 38 and ignited. Directional shield 40 was adapted to transfer heat energy 56 into the high velocity air stream 58 flowing near shield 40 as it traveled in line 32 towards reactivation chamber 12 and to remove a suitable amount of moisture from desiccant rotor 4 by projecting radiant heat onto reactivation chamber 12, while minimizing the potential for high velocity air to adversely affect the combustion process occurring in radiant burner 38. See FIG. 1. The size and shape of radiant burner 38 and directional shield 40, and air and gas flowrates were adapted to complement each other such that a pre-specified maximum level of radiant heat was produced.

EXAMPLE 2

Construction of Prototype

A metal fiber radiant burner 38 (specifications: propane- or natural gas-fueled; 150,000 BTU; 100 cfm air stream capability; part no. 3248; Burner Systems, International, Chattanooga, Tenn.) was modified by adding a directional shield 40 made of 306 (16 gauge) stainless steel around burner 38 and a combustion air plenum 42. Directional shield 40 had a length of 11 in and a diameter of 12 in, which allowed directional shield 40 to extend approximately 2 in pass the end of radiant burner 38. Combustion air plenum 42 (Air Quest Systems, Inc., Kiln, Miss.) was made from 4-inch aluminum square tubing and was attached to radiant burner 38 to supply gas and air to burner 38. A combustion blower 36 having a damper (not shown; model No. 354; Blowers & Motors, LLC) was attached to the intake side of the air plenum to provide positive pressure capable of forcing gas and air into radiant burner 38.

The modified radiant burner 38 was then incorporated into a conventional desiccant dehumidifier 2 such as an AQS 3200 dehumidifier (Air Quest Systems, Inc., Kiln, Miss.) comprising a silica gel desiccant rotor having a three process quadrants and a reactivation quadrant, a process air blower, a reactivation air blower, VITON® seals for separating the process and reactivation air streams, and a control system, by mounting the outlet of the radiant burner 38 near the reactivation chamber 12 to supply 1100 cfm, 300° F. air capable of reactivating the desiccant by absorbing off moisture. The control system was adapted to control ignition by regulating flammable gas (e.g., propane, natural gas, etc.) using a gas valve 44 and an orifice 50. Burner 38 was ignited using a direct spark or a hot surface igniter controlled by a thermostatically- or moisture content-driven, standard ignition module.

A duct-mounted thermostat (not shown; Johnson Controls, Milwaukee, Wis.) was used to measure the temperature of pre-reactivation air entering desiccant rotor 4. The thermostat was placed near desiccant rotor 4 in pre-reactivation air stream 32. A 10 in backward incline, 3450 RPM, 2.0 hp air blower 16 (model # SQBD 10, Chicago Blower, Glendale Heights, Ill.) was used to supply pre-reactivation airflow through shielded radiant burner assembly 18 and desiccant rotor 4 at a maximum flow rate of 1100 ft$^3$/min.

EXAMPLE 3

Testing of Constructed Prototype

To confirm that the prototype dehumidifier was highly effective, trials were conducted at AQS Manufacturing Facility, Kiln, Miss. using the prototype described in Example 2. Once the prototype was set up and operating specifications (e.g., humidity and temperature levels) selected, start-up was initiated. Pre-process air having a temperature of 95° F. and a humidity level of 120 grains H$_2$O/lb air flowed through filtered inlet 20 and was divided into first and second streams before entering desiccant rotor assembly 4. The desiccant rotor decreased the moisture level in the pre-process air to form a post-process air having an average moisture level of 70 grains H$_2$O/lb air, which was exhausted into the affected space at 140° F.

Several conclusions were reached. The dehumidifier having a shielded radiant burner assembly was effective in drying moisture-laden structures. The shielded radiant burner assembly was effective in regenerating the desiccant rotor by projecting radiant heat towards the reactivation side of the rotor to remove any moisture. The shielded radiant burner assembly reduced fuel consumption to a range of between about 135 BTU and about 150 BTU, while controllably producing process air having an average temperature of about 140° F.

The complete disclosures of all references cited in this specification are hereby incorporated by reference. In the event of an otherwise irreconcilable conflict, however, the present specification shall control.

We claim:

1. An air-dehumidifier for conditioning air, comprising:
   (a) a desiccant rotor comprising one or more process chambers and one or more reactivation chambers, through which chambers air can flow; wherein said process chambers are adapted to heat and dehumidify a process air stream to form a post-process air stream for removing moisture from a moisture-laden space or structure;
   (b) at least one shielded radiant burner assembly comprising a radiant burner having a directional shield, a combustion blower, and a combustion air plenum adapted to supply a suitable amount of fuel and air to said radiant burner to allow for combustion and emission of radiant heat when ignited; wherein said shielded radiant burner assembly is adapted to regenerate said desiccant rotor by removing moisture from said one or more reactivation chambers by projecting a suitable amount of radiant heat onto said desiccant rotor and by transferring a suitable amount of radiant heat from said radiant burner to a pre-reactivation air stream flowing near said directional shield; wherein said directional shield is sized and shaped to minimize the potential for the pre-reactivation air stream to interrupt the combustion of air and fuel by said radiant burner; and wherein said combustion blower is adapted to eject a mixture of fuel and air through said radiant burner; and
   (c) a control system having a temperature sensor for measuring the temperature of the pre-reactivation air, wherein said control system is adapted to control the temperature of the pre-reactivation air stream by modulating the gas pressure and combustion airflow to adjust the amount of radiant heat generated by said radiant burner.

2. An air-dehumidifier as recited in claim 1, wherein said air-dehumidifier further comprises a controller assembly having an ignition controller and a temperature sensor.

3. An air-dehumidifier as recited in claim 1, wherein said air-dehumidifier is adapted to draw the pre-reactivation air stream from inside the moisture-laden space or structure.

4. An air-dehumidifier as recited in claim 1, wherein said air-dehumidifier is adapted to draw the pre-reactivation air stream from outside the moisture-laden space or structure.

5. An air-dehumidifier as recited in claim 1, wherein said desiccant rotor further comprises a desiccant mass selected from the group consisting of silica gel, molecular sieve, and lithium chloride.

6. An air-dehumidifier as recited in claim 1, wherein said desiccant rotor comprises three process chambers.

7. An air-dehumidifier as recited in claim 6, wherein said desiccant rotor comprises one reactivation chamber.

8. An air-dehumidifier for conditioning air, comprising:
   (a) a desiccant rotor comprising one or more process chambers and one or more reactivation chambers, through which chambers air can flow; wherein said process chambers are adapted to heat and dehumidify a process air stream to form a post-process air stream for removing moisture from a moisture-laden space or structure; and
   (b) at least one shielded radiant burner assembly comprising a radiant burner having a directional shield, a combustion blower, and a combustion air plenum adapted to supply a suitable amount of fuel and air to said radiant burner to allow for combustion and emission of radiant heat when ignited; wherein said shielded radiant burner assembly is adapted to regenerate said desiccant rotor by removing moisture from said one or more reactivation chambers by projecting a suitable amount of radiant heat onto said desiccant rotor and by transferring a suitable amount of radiant heat from said radiant burner to a pre-reactivation air stream flowing near said directional shield; wherein said directional shield is sized and shaped to minimize the potential for the pre-reactivation air stream to interrupt the combustion of air and fuel by said radiant burner; and wherein said combustion blower is adapted to eject a mixture of fuel and air through said radiant burner; and wherein said combustion blower further comprises a damper capable of controllably adjusting the air and fuel pressures to a level sufficiently greater than ambient pressure, and loading the air and fuel into said radiant burner.

9. An air-dehumidifier as recited in claim 1 or 8, wherein said air-dehumidifier further comprises a process air blower adapted to draw into said one or more process chambers a process air stream and to eject a post-process air stream into a moisture-laden space or structure.

10. An air-dehumidifier as recited in claim 1 or 8, wherein said air-dehumidifier further comprises a reactivation air blower adapted to draw into said one or more reactivation chambers a reactivation air stream.

11. An air-dehumidifier as recited in claim 1 or 8, wherein the pre-reactivation air stream flows in a direction parallel to said directional shield.

12. An air-dehumidifier as recited in claim 1 or 8, wherein the pre-reactivation air stream flows pass said directional shield at a velocity of at least 500 ft/mm.

13. A method for drying a moisture-laden space or structure, comprising the steps of:
    (a) introducing a process air stream into an air-dehumidifier comprising a desiccant rotor comprising one or more process chambers and one or more reactivation chambers, through which chambers air can flow; and a shielded radiant burner assembly comprising a radiant burner having a directional shield, a combustion blower, and a combustion air plenum adapted to supply a suitable amount of fuel and air to said radiant burner to allow for combustion and emission of radiant heat; wherein the process air stream is drawn into the desiccant rotor through the one or more process chambers; and wherein the air-dehumidifier further comprises a control system having a temperature sensor for measuring the temperature of the pre-reactivation air stream; and wherein the control system is adapted to control the temperature of the pre-reactivation air stream by modulating the gas pressure and combustion airflow to adjust the amount of radiant heat generated by the radiant burner;
    (b) igniting fuel and air supplied to the radiant burner to create a flame adapted to generate radiant heat;
    (c) heating and dehumidifying the process air stream by flowing the process air stream through the one or more process chambers and carrying over heat from the one or more reactivation chambers to the process air stream; and wherein the heat produced by the one or more reactivation chambers allows for dehumidification of the process air stream by absorbing water vapor from the one or more reactivation chambers;
    (d) ejecting the post-process air stream into the moisture laden space or structure;
    (e) drawing a pre-reactivation air stream into the air-dehumidifier from the moisture laden space or structure, or from the ambient environment;
    (f) flowing the pre-reactivation air stream near the directional shield;
    (g) shielding the flame produced by the radiant burner from the pre-reactivation air stream;
    (h) reactivating the pre-reactivation air stream by transferring the radiant heat from the radiant burner to the pre-reactivation air stream flowing near the directional shield; and
    (i) removing moisture from the one or more reactivation chambers by projecting a suitable amount of radiant heat onto the desiccant rotor and by flowing the reactivation air stream through the one or more reactivation chambers.

14. A method as recited in claim 13, wherein the air-dehumidifier further comprises a controller assembly having an ignition controller and a temperature sensor.

15. A method as recited in claim 13, wherein the desiccant rotor comprises three process chambers.

16. A method as recited in claim 15, wherein the desiccant rotor comprises one reactivation chamber.

17. A method for drying a moisture-laden space or structure, comprising the steps of:
    (a) introducing a process air stream into an air-dehumidifier comprising a desiccant rotor comprising one or more process chambers and one or more reactivation chambers, through which chambers air can flow; and a shielded radiant burner assembly comprising a radiant burner having a directional shield, a combustion blower, and a combustion air plenum adapted to supply a suitable amount of fuel and air to said radiant burner to allow for combustion and emission of radiant heat; wherein the process air stream is drawn into the desiccant rotor through the one or more process chambers; and wherein the combustion blower further comprises a damper capable of controllably adjusting the air and fuel pressures to a level sufficiently greater than ambient pressure, and loading the air and fuel into the radiant burner;
    (c) igniting fuel and air supplied to the radiant burner to create a flame adapted to generate radiant heat;
    (c) heating and dehumidifying the process air stream by flowing the process air stream through the one or more process chambers and carrying over heat from the one or more reactivation chambers to the process air stream; and wherein the heat produced by the one or more reactivation chambers allows for dehumidification of the process air stream by absorbing water vapor from the one or more reactivation chambers;
    (d) ejecting the post-process air stream into the moisture laden space or structure;
    (e) drawing a pre-reactivation air stream into the air-dehumidifier from the moisture laden space or structure, or from the ambient environment;
    (f) flowing the pre-reactivation air stream near the directional shield;
    (g) shielding the flame produced by the radiant burner from the pre-reactivation air stream;
    (h) reactivating the pre-reactivation air stream by transferring the radiant heat from the radiant burner to the pre-reactivation air stream flowing near the directional shield; and
    (i) removing moisture from the one or more reactivation chambers by projecting a suitable amount of radiant heat onto the desiccant rotor and by flowing the reactivation air stream through the one or more reactivation chambers.

18. A method as recited in claim 13 or 17, wherein the air-dehumidifier further comprises a process air blower adapted to draw into the one or more process chambers a process air stream and to eject a post-process air stream into the moisture-laden space or structure.

19. A method as recited in claim 13 or 17, wherein the air-dehumidifier further comprises a reactivation air blower adapted to draw into the one or more reactivation chambers a reactivation air stream.

20. A method as recited in claim 13 or 17, wherein the pre-reactivation air stream flows in a direction parallel to the directional shield.

21. A method as recited in claim 13 or 17, wherein the pre-reactivation air stream flows pass the directional shield at a velocity of at least 500 ft/mm.

22. A shielded radiant burner assembly, comprising:
    (a) a radiant burner adapted to combust air and fuel and to project a suitable amount of radiant heat onto an object or mammal, or into a space or structure;
    (b) a combustion air plenum adapted to supply a suitable amount of fuel and air to said radiant burner to allow for combustion and emission of radiant heat when ignited;

(c) a directional shield sized and shaped to minimize the potential for the interruption of the combustion of air and fuel by an air stream flowing near said radiant burner at a velocity which would be expected to interrupt the flame produced by a similar radiant burner without a directional shield;

(d) an air blower adapted to flow an air stream near said directional shield such that a suitable amount of radiant heat is transferred from the radiant burner to the air stream by convecting the radiant heat through said directional shield; and (e) a combustion blower; wherein said combustion blower is adapted to eject a mixture of fuel and air through said radiant burner, wherein said combustion blower further comprises a damper capable of controllably adjusting the air and fuel pressures to a level sufficiently greater than ambient pressure, and loading the air and fuel into said radiant burner.

23. A shielded radiant burner assembly as recited in claim 22, wherein the air stream flows in a direction parallel to said directional shield.

24. A shielded radiant burner assembly as recited in claim 22, wherein the air stream flows pass said directional shield at a velocity of at least 500 ft/mm.

25. A shielded radiant burner assembly as recited in claim 22, wherein said directional shield has a shape selected from the group consisting of cylindrical, rectangular, square and triangular.

26. A shielded radiant burner assembly as recited in claim 22, wherein said shielded radiant burner assembly further comprises an air plenum adapted to direct the air stream drawn by said air blower near said directional shield.

27. An air-dehumidifier as recited in claim 8, wherein said air-dehumidifier further comprises a controller assembly having an ignition controller and a temperature sensor.

28. An air-dehumidifier as recited in claim 8, wherein said air-dehumidifier is adapted to draw the pre-reactivation air stream from inside the moisture-laden space or structure.

29. An air-dehumidifier as recited in claim 8, wherein said air-dehumidifier is adapted to draw the pre-reactivation air stream from outside the moisture-laden space or structure.

30. An air-dehumidifier as recited in claim 8, wherein said desiccant rotor further comprises a desiccant mass selected from the group consisting of silica gel, molecular sieve, and lithium chloride.

31. An air-dehumidifier as recited in claim 8, wherein said desiccant rotor comprises three process chambers.

32. An air-dehumidifier as recited in claim 31, wherein said desiccant rotor comprises one reactivation chamber.

33. A method as recited in claim 17, wherein the air-dehumidifier further comprises a controller assembly having an ignition controller and a temperature sensor.

34. A method as recited in claim 17, wherein the desiccant rotor comprises three process chambers.

35. A method as recited in claim 34, wherein the desiccant rotor comprises one reactivation chamber.

* * * * *